Dec. 10, 1929.　　T. L. FAWICK　　1,738,697
TRANSMISSION
Filed May 19, 1923　　4 Sheets-Sheet 1

Witnesses:　　Inventor:
W. F. Kilroy　　Thomas L. Fawick
Harry R. L. White　　By Brown, Boettcher & Dienner
　　Attys.

Dec. 10, 1929.  T. L. FAWICK  1,738,697
TRANSMISSION
Filed May 19, 1923  4 Sheets-Sheet 2

Inventor:
Thomas L. Fawick

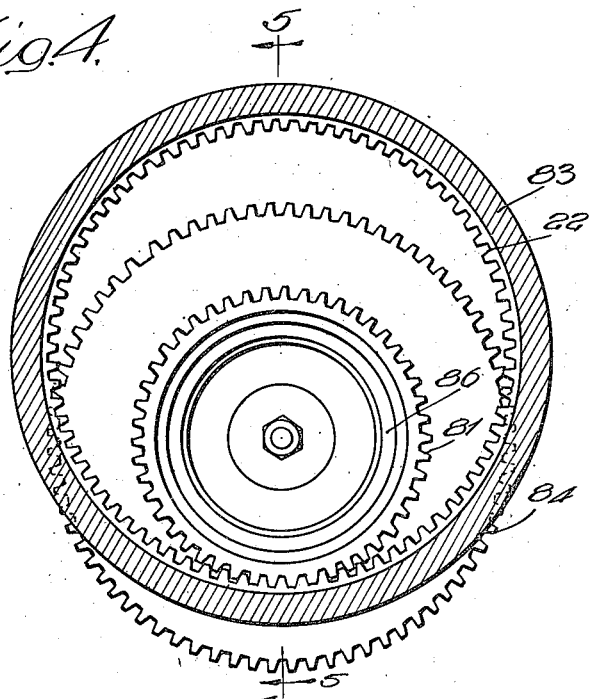
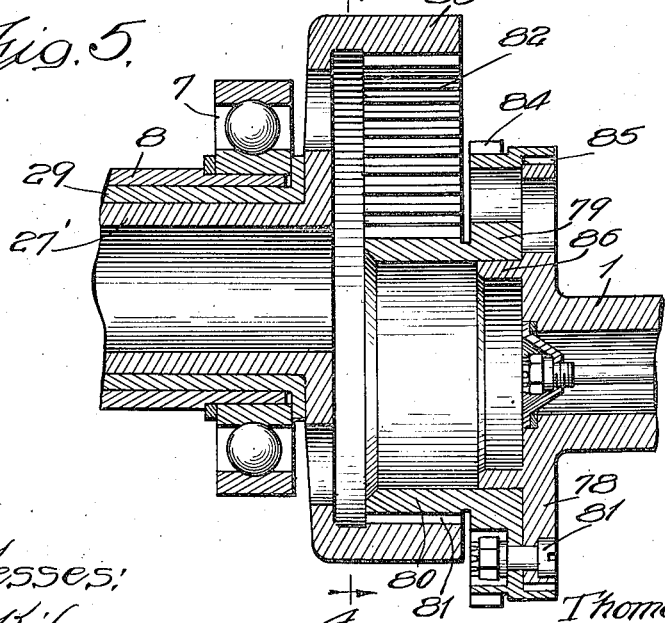

Dec. 10, 1929.                T. L. FAWICK                 1,738,697
                              TRANSMISSION
                         Filed May 19, 1923        4 Sheets-Sheet 4

Witnesses:
W. F. Kilroy
Harry R. L. White

Inventor:
Thomas L. Fawick

Patented Dec. 10, 1929

1,738,697

UNITED STATES PATENT OFFICE

THOMAS L. FAWICK, OF RACINE, WISCONSIN, ASSIGNOR TO BROWN-LIPE GEAR COMPANY, OF SYRACUSE, NEW YORK, A CORPORATION OF NEW YORK

TRANSMISSION

Application filed May 19, 1923. Serial No. 640,046.

My invention relates generally to driving mechanism for automotive devices and is particularly applicable to transmissions for airplanes or other aircraft.

While I shall describe my invention in connection with the details of a particular embodiment peculiarly applicable to airplanes, it will be understood that the invention is not to be limited to such use, but may be employed wherever found adaptable.

It is customary to couple the propeller shaft and engine shaft of an aeroplane directly together. The propeller is designed to impose the proper load upon the engine in the ordinary course of flying at moderate altitudes. The density of the atmosphere decreases with the altitude and if altitudes in excess of ten to fifteen-thousand feet are reached, there is a very noticeable decrease in air density. The result is that the propeller which was designed to move in the relatively dense air nearer the sea level does not take the proper hold upon the air and spins more freely permitting the engine to race at an injurious speed. This occurs particularly where the aeroplane is employed for high altitude work and is operated with a supercharger. The supercharger maintains the horsepower of the engine substantially uniform or constant up to from 20,000 feet to 40,000 feet altitude. As the air is thinner, the same power operating upon the propeller tends to spin it more rapidly, injuriously racing the engine.

If the propeller could be driven at a relatively higher speed than engine speed, that is, geared up with respect to the engine, it would be highly advantageous because the propeller and engine would both be working under more favorable conditions and would operate at better efficiency. Theoretically, the propeller should be speeded up in proportion as the density of the air decreases. Numerous proposals have been made to provide a variable speed propeller, but so far as I am aware, no practical results have ever been attained heretofore.

No one, so far as I am aware, has seriously considered the employment of a gear box and change gears for an aeroplane because of the excessive weight and the room required. The possible loss in efficiency has also been a deterrent so that prior to my invention the employment of a changeable driving ratio has been considered completely out of the question. I am well aware that it is old to have change speed gears in automobiles and the like, but conditions in an aeroplane are quite different, and besides, the change speed gears in an automobile are always accompanied in practice by a friction clutch to permit of gear changing. Hence, automobile practice does not suggest a suitable transmission for aeroplanes.

According to my invention, I provide a change speed gear driving connection between engine and propeller of an aeroplane which permits the propeller to run at engine speed or at a higher speed. The higher speed is preferably a compromise speed for all altitudes above a predetermined value although the invention is not limited to this. This connection dispenses with a friction clutch and depends upon the positive engagement of driving parts.

The preferred form of transmission in accordance with my invention provides a simple and rugged transmission consisting of a gear box comprising two gears only. With these two gears and a positive clutch which may be formed in part of one of the gears, I secure two speeds of the propeller with respect to the engine. My invention is not limited, however, to the use of two gears only, as I may employ more than two speeds and I may employ also a reverse. I may use a number of rows of driving teeth and a single driven gear or vice versa, as will be more apparent from the detailed description hereafter. A particular and noteworthy feature of the present invention is the employment of an internal gear meshing with an external gear whereby a greater extent of meshing of the teeth, and hence greater strength, is secured. This results also in a much quieter gear than is customary with two external gears meshing. The factor of safety of two such gears as I have provided is relatively greater than that of two external gears, and hence relatively narrower gear faces may be employed. Also, the relative rate of motion between the teeth of the meshing gears is greatly reduced as the teeth of both gears run in the same direction. This gives the effect of a partially direct drive.

As I dispense with a friction clutch and as the propeller is rotated by motion through the air, it is desirable to have some means which will indicate the relative tooth speeds of the engine shaft with respect to the propeller shaft so that meshing of the gears may be satisfactorily accomplished.

Preferably I provide an indicator which indicates the actual speeds of the two shafts and also the actual tooth speeds with respect to each other. This indicator is so arranged as to indicate readily when synchronism is established so that the gears may be brought into mesh without clashing.

According to the preferred form of my invention, I hold the engine shaft rigidly in position and move the propeller shaft parallel to itself by a lateral motion of translation. To clutch the shafts together I move the movable shaft laterally to take the gears out of mesh and to bring the two shafts axially in line, then I plunge the movable shaft axially to clutch the shafts axially in line or to secure a different driving ratio. In the actual construction the propeller shaft is shifted in the lateral motion of translation by a revolution of the cage or bearings in which it is mounted about a center external to the axis of the propeller shaft. By such construction I may either reduce the speed of the propeller shaft with respect to the engine, or step it up or reverse the motion of the propeller shaft with respect to the engine shaft, and I may, if it is found desirable, employ several sets of gears to secure these various actions. This type of construction, that is, where the propeller shaft is shifted laterally and plunged axially may be used in automobile construction where the propeller shaft is provided with suitable universal joints for transmitting the drive even though at a slight angle, for example, I propose to use this type of change gears in the vehicle construction described in my copending application, Case 5, Serial No. 619,840, filed February 19, 1923, by inserting a pair of universal joints in the drive shaft.

While I have above stated that the propeller shaft is revolved or otherwise shifted sidewise and thereafter plunged axially, it is to be understood that the movement of the two shafts is relative with respect to each other and that instead of plunging the entire propeller shaft, a portion only of the same may be plunged, or a separate element on the propeller shaft or on the engine shaft, or both, may be plunged in order to secure the final meshing.

There is, however, a peculiar advantage in shifting the propeller shaft rather than the engine shaft, because in an aeroplane or other vehicle employing a propeller, the fixed location of the propeller on the plane or vehicle is not generally essential.

In order to acquaint those skilled in the art with the manner of constructing and operating a device embodying my invention, I shall now describe a specific embodiment in connection with the accompanying drawings in which;

Figure 4 is a section on the line 4—4 of Figure 5; and

Figure 5 is a longitudinal fragmentary section taken on the line 5—5 of Figure 4; these Figures 4 and 5 illustrating a modification.

Figure 7:
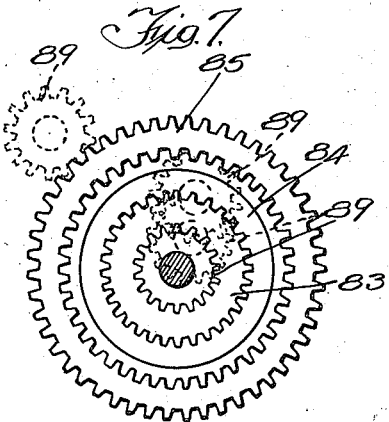
Figure 8:
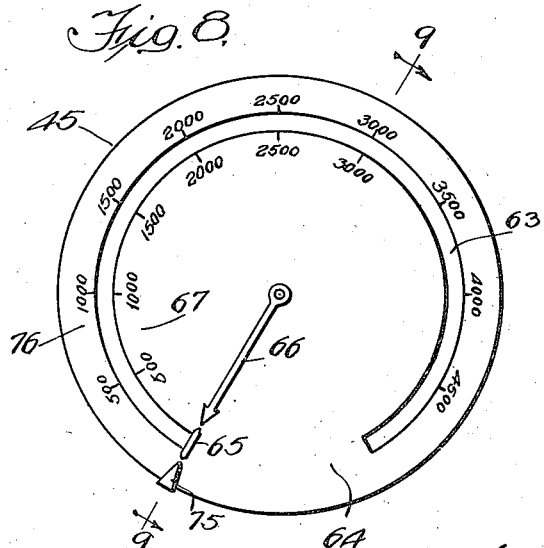
Figure 9:
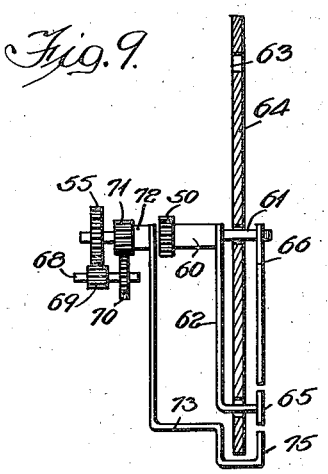

Figure 7 a transverse section of a modified form of gearing embodying my invention;

Figure 8 is a front elevational view of the synchronism indicator and speed indicator forming a part of the invention;

Figure 9 is a sectional view taken on the line 9—9 of Figure 8; and

Figures 10, 11, 12 and 13 are diagrams illustrating the operation of the indicator.

Figure 1:
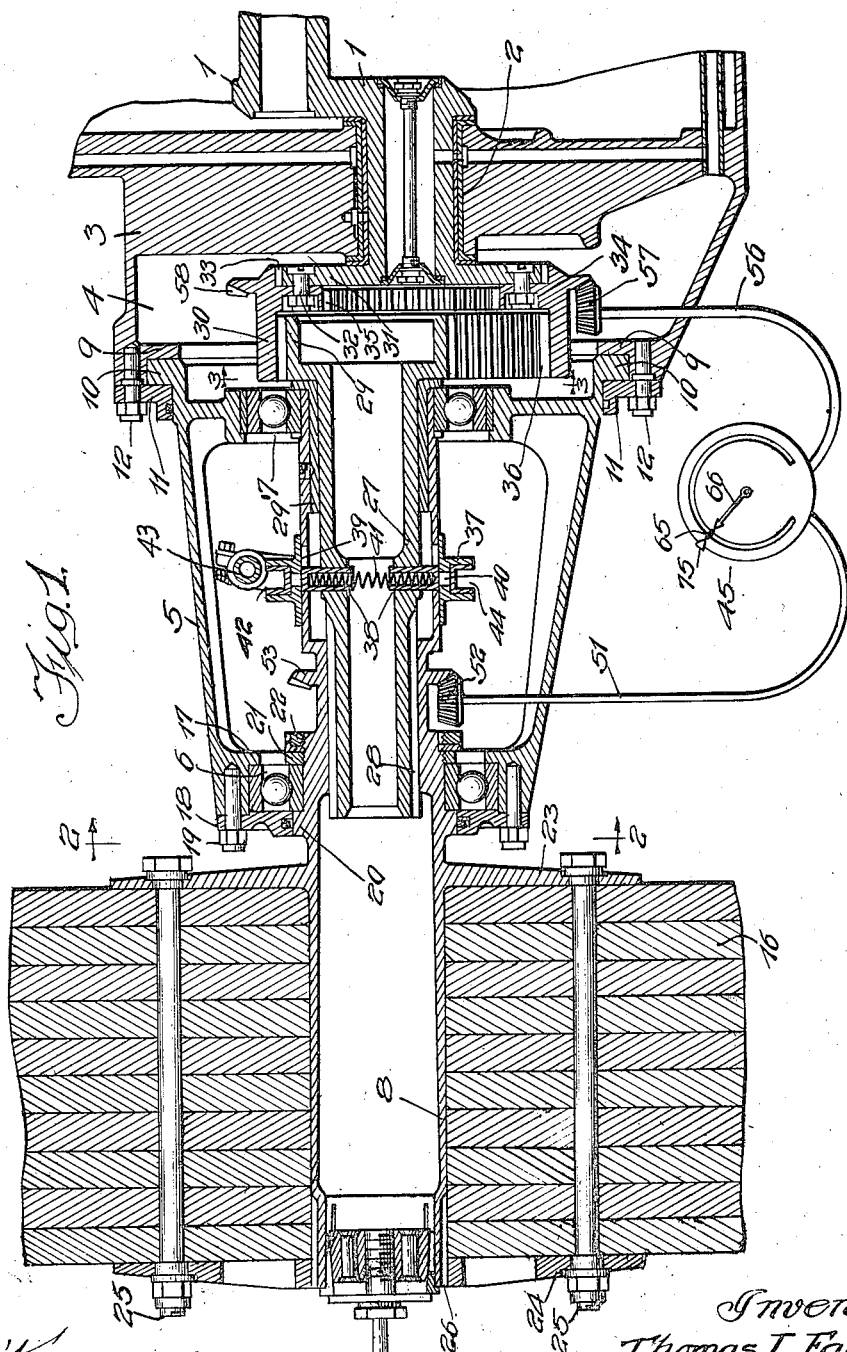
Figure 1 is a longitudinal vertical section.
Figure 2:
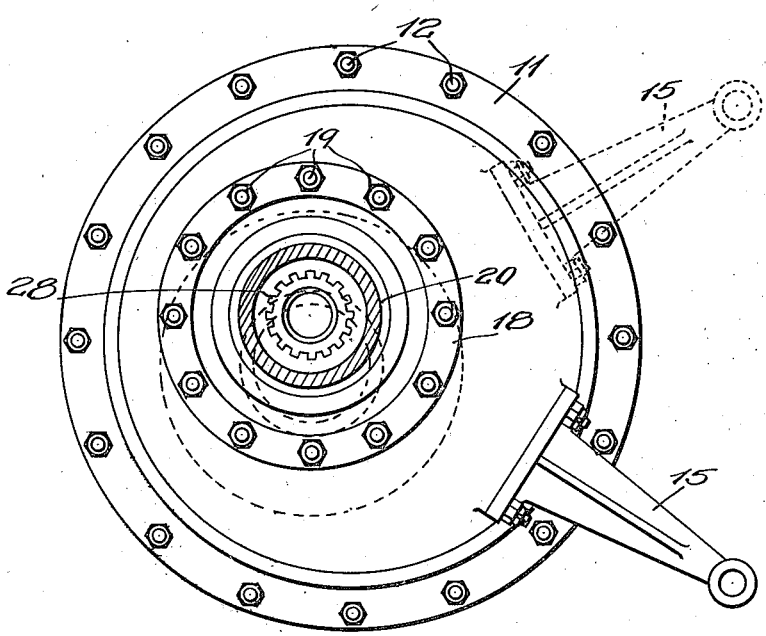
Figure 2 is a transverse sectional view on the line 2—2 of Figure 1.
Figure 3:
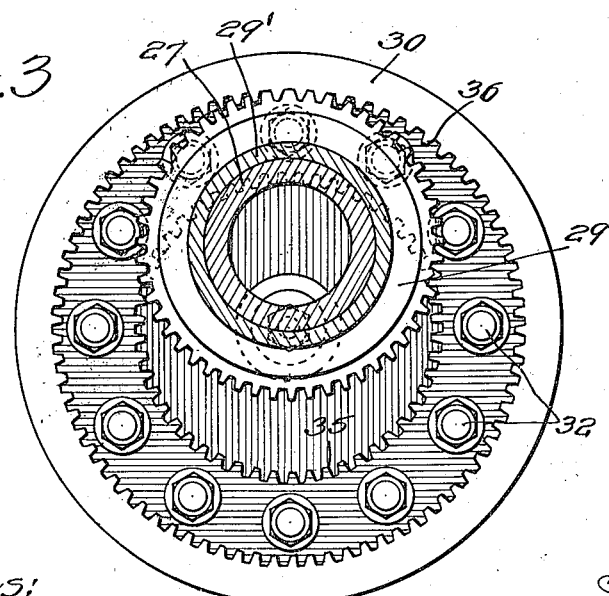
Figure 3 is a fragmentary cross sectional view taken on the line 3—3 of Figure 1.

Referring now particularly to Figures 1, 2 and 3, I have shown the crank shaft 1 of the engine as mounted in a suitable bearing 2 in the stationary engine frame 3. The forward part of this frame forms a gear box 4 which is preferably filled with lubricating material, the cover of the box being a housing 5 which supports the bearings 6 and 7 for the propeller shaft 8. The housing 5 may also be filled to the desired level with a lubricant. The housing 4 has an inturned circular flange 9 which is preferably eccentric with respect to the axis of the crank shaft 1. The shafts 1 and 8 are essentially eccentric with respect to the cylindrical flange 10, so that angular motion of said flange 10 will cause lateral shifting of the propeller shaft 8 with respect to the engine shaft 1 from a position of axial alignment to a parallel position of non-alignment. As will be observed from Figs. 2 and 3, the axis of the eccentric flange 10 must be offset with respect to the axis of the crank shaft 1, in order that the axis of the propeller shaft 8 may be brought accurately into alignment with the axis of said crank shaft. The axis of the propeller shaft 8 must be eccentric to the axis of the cylindrical flange 10 by an amount sufficient to permit shifting of the pinion from its position of axial alignment with the crank shaft 1 to its offset position where the pinion is tangent to and meshing with the ring gear 30. A suitable annular recess is provided just outside of the flange 9 in which there is seated the circular flange 10 of the rear end of the housing 5. A ring 11 is clamped against the end of the housing 4 and it retains the flange 10 in the recess between said ring 11 and flange 9. The housing 5 with its flange 10 is movable in the recess or ring thus formed. This housing 5 has an operating lever 15 attached thereto, as shown in Figure 2, by which the housing may be rotated to bring the gears into alignment for meshing. In the position shown in Figure 1 the axis of the two shafts, namely, the crank shaft 1 and the propeller shaft 8 are in such position that co-operating gears are in mesh. The front bearings 6 of the housing 5 take the axial thrusts of the propeller 16 and to this end the outer race of the bearing is held between an inturned flange 17 and a clamping ring 18 which is held in place by means of the bolts 19. The inner ring of the bearing 6 is held between a circular shoulder or flange 20 on the propeller shaft 8 and a threaded clamping ring 21 threaded on a suitable portion of the shaft 8. This ring 21 is held by a suitable clamping or lock ring 22. The propeller shaft 8 is provided with a circular flange 23 against which is clamped the propeller 16, this propeller being preferably made up in the usual way of laminated wood or any other preferred manner. The hub of the propeller is clamped between said flange 23 and a clamping plate or flange 24 at the front end which plates are secured together by means of the through bolt 25. The front plate 24 is preferably seated upon the forward end of the shaft 8 which is splined as indicated at 26. The shaft 8 is hollow, the front end thereof being closed by a suitable wedged plug to prevent the entry of foreign matter, and to attach a conical cap as is well understood by those skilled in the art. The propeller shaft 8 has telescoped therewith a stub pinion shaft 27 which is provided at its forward end with splines 28 meshing or engaging with suitable splines formed upon the inside of the propeller shaft 8 at the corresponding portion and provided with a suitable bearing 29' at its rear portion snugly fitting about the adjacent part of the stub shaft 27. The stub shaft 27 being splined in the propeller shaft 8 and also having a suitable sliding bearing at 29' is adapted to be moved axially, that is telescopes into or projected out of the shaft 8, as the case may be. The shaft 27 has at its rear end the integral pinion 29 adapted to mesh with the internal gear 30 which gear is bolted onto the flange 31 of the propeller shaft 1 by the bolt 32. The teeth of the pinion 29 are at the same time gear teeth for meshing with the gear teeth of gear 30 and splines or clutch teeth for engaging the splines or clutch teeth 35. The outer gear 30 has in reality three sets of teeth; first the actual gear teeth which are in mesh with the pinion 29 as shown in Fig. 1; next the teeth or splines at the rear as indicated at 33 where the ring gear 30 meshes with the teeth on the plate 31 on the engine shaft so that these two parts, namely, the ring 30 and the flange 31 are keyed together and in addition the interior periphery of the flange 34 is provided with teeth 35. The bolts 32 pass through the flange 34 between the outer gear teeth 36 and the inner gear teeth 35. The stub shaft 27 is adapted to be moved axially in the propeller shaft 8 by means of a collar 37 which has the pins 38 extending through slot 39 in the propeller shaft 8. These pins 38 fit into diametrically opposite holes in the stub shaft 27 and have reduced end portions 40 which set into the ring 37 being held therein by a spring 41 which spring pushes the pins diametrically outward into the holes formed in the ring 37. The ring 37 is adapted to be engaged by a suitable shifting fork, one arm of which is shown at 42 in Figure 1. This shifter fork is mounted on a rock shaft 43 which projects through the sides of the housing 5 and may be operated by a suitable handle not shown. A common operating mechanism for rotating the housing 5 and for thereafter plunging the stub-shaft 27 is preferably employed.

It will be seen from Figures 2 and 3 that by rotation of the housing 5 on its flange 10 which flange is not concentric with the axis of the pinion shaft 27 and propeller shaft 8, the axis of the propeller shaft and stub shaft may be brought into line with the axis of crank 1 and the stub shaft then moved axially to the rear so that the teeth of the pinion mesh with the teeth 35 in the flange of the ring 30. The arrangement of gears is very compact. It will be noted that the teeth 35 are not as long as the pinion teeth but since they serve merely as splines and not as actual gear teeth, such length is ample.

In order to be able to make the shift from one gear ratio to another without injury to the teeth, I provide the indicator 45 which is both a speed indicator for indicating the speed of the engine shaft and of the propeller shaft and a synchronism indicator for indicating when the teeth of the respective gears are operating in unison or synchronism so that the meshing of the same can be accomplished without clashing. The construction of this indicator is shown in Figures 8 and 9. The indicator comprises two driven elements, namely, the pinion 50 which is connected to a speed responsive element (not shown) by a flexible shaft 51 to the propeller shaft 8 as by means of the cone gear pinion 52 and the cone gear 53 which latter is mounted upon the shaft 8, and also the pinion 55 which is connected to a second speed responsive element (not shown) which is driven through a flexible shaft 56 and cone pinion 57 and cone gear 58 mounted on the crank shaft 1. The pinion 50 is secured to a sleeve 60 mounted on shaft 61 and this sleeve has connected thereto an arm 62 passing through a slot 63 of the circular dial 64 and bearing at its free end the indicating member 65 which member is in the shape of a short bar. The pinion 55 which is moved in accordance with the speed of the engine shaft, is secured to the shaft 61 and it drives the central pointer 66 over the dial 64 in co-operation with the scale 67 which is graduated in terms of engine speed. The gear 55 is connected through a lay-shaft or countershaft 68 and back gears 69, 70 and 71 with a sleeve 72 which is also mounted upon the shaft 61, and which sleeve is connected to an indicating arm 73 bearing at its outer free end the pointer 75. This pointer 75 co-operates with the outer scale 76 to indicate the tooth speed of the high speed gear in terms of revolutions of the propeller shaft which should correspond to the same tooth speed. In the present construction the ratio of engine speed to propeller speed is one to one when the shafts are clutched together and two to three when the pinion and ring gear 30 are in mesh.

I have therefore shown in the diagrams the manner in which the operation of shifting gears may be indicated on the indicator 45.

Figure 10:
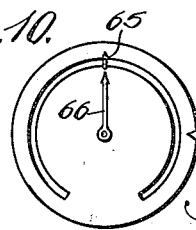
Figure 11:
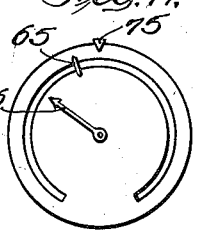

Assume that the pinion 29 and the engine shaft 1 are clutched together so that the engine shaft and the propeller shaft are rotating at the same speed. Now it is apparent that the tooth speed of the internal gear 30 in actual teeth per minute is higher than the tooth speed of the pinion 29, consequently the indicating member 75 which moves around the outside margin of the dial 6 indicate a speed which is proportional to the diameter of the respective geared members, that is to say, the indicator at 75 will indicate 50 percent greater speed than the propeller and engine shaft which are indicated by the members 65 and 66 respectively. As shown in Figure 10 the propeller shaft indicator 65 and the engine shaft indicator 66 both show the same speed, we will say in the neighborhood of 2500 R. P. M. For all variations of engine speed the propeller speed will vary accordingly, but the high speed indicator 75 varies at a ratio which is a multiple of the engine speed—in this case, three halves of the same. Now assume that it is desired to shift from direct drive to the geared up drive as indicated in Figure 1. First the pinion stub shaft 27 is moved axially to the left, taking the teeth of the pinion and the teeth of the clutch 35 out of mesh. Thereafter the housing is to be rotated until the teeth 29 come into mesh with the teeth of the ring gear 30, but this should not be done until the tooth speeds are equal. Assume, therefore, that the engine has been disconnected and begins to slow down and at the same time due to the propeller shaft being no longer driven by the engine its speed drops down as shown in Figure 11. In order to gain synchronism between the high speed gear and the propeller shaft it is necessary now either that the propeller shaft be speeded up, which might be accomplished in certain air craft by diving, or that the engine speed be slowed down until the condition of synchronism between the propeller shaft and the gear of the engine shaft be secured. We will assume that the engine speed is decreased, as is indicated in Figure 11, the pointer 75 which indicates the multiple of engine shaft speed; namely the tooth speed of the gear 30 begins to drop down and approach the indicator 65 which indicates propeller shaft speed.

Figure 12:
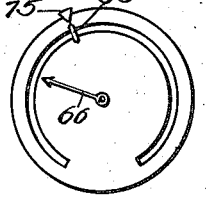
Figure 13:
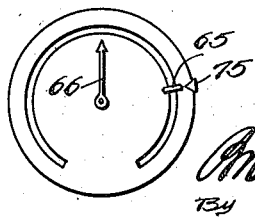

In Figure 12 we assume that the engine speed has dropped down sufficiently to have the teeth of the gear 30 moving at the same speed as the teeth of the pinion 29 and this is indicated by registry of the indicating members 65 and 75. The shifting of the housing 5 in a rotary direction is now completed to bring the gears into mesh and thereupon the engine may be speeded up and brought to its former speed as indicated by the pointer 66 whereupon the propeller will be driven at the rate indicated on the dial and at the same rate as to tooth speed as shown by pointer 75.

To shift from high gear to direct drive may be accomplished in the reverse order.

Obviously the ratio of drive may be changed as desired and instead of increasing the speed of the propeller shaft its speed may be decreased by gearing the same down when the gears are in mesh.

In Figures 4 and 5 I have indicated a modification in which the engine shaft 1 has a suitable clamping flange 78 to which is secured a combined clutch and pinion 79, this combined clutch and pinion having the pinion member 80 with suitable teeth formed thereon to cooperate with the teeth 82 on the internal gear 83 which internal gear is preferably formed integral with the stub shaft 27' axially slidable in the propeller shaft 8. The member 79 has the clutch teeth 84 adapted to engage the outer ends of the teeth 82 when the axis of the stub shaft 27 and the engine shaft 1 are in line and when the two are moved axially with respect to each other. The member 79 also has clutch teeth at 85 adapted to engage suitable teeth or splines on the periphery of the flange 78 on the engine shaft 1. The engine shaft 1 has a cylindrical flange 86 adapted to fit into the member 79 to support the same. The member 79 and the flange 78 are clamped together by suitable bolts 87.

In this construction the low speed of the propeller shaft is secured by the driving ratio between the pinion 80 and the ring gear 83 and the high speed is secured by meshing the clutch teeth 84 with the gear teeth 82 so that the shafts are clutched together. A similar indicating device such as shown in Figures 1 and 8 to 13 may be employed in this connection. In this case the ring or internal gear is rotated and plunged instead of the pinion being rotated and plunged to make the shift in gear ratio.

Figure 6:
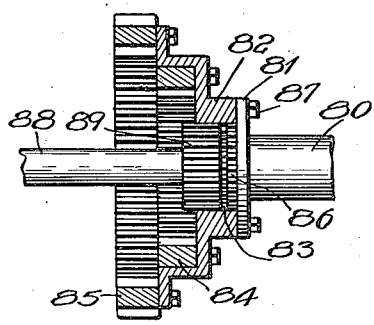
Figure 6 is a longitudinal section.

In Figures 6 and 7, I have shown a further modification in which a number of forward gear ratios and a reverse may be secured. In this case the engine shaft 80 has a flange 81 which is bolted to a circular housing 82. This housing has mounted therein clutch teeth at 83, a ring gear at 84 and an outer ring gear at 85, this latter ring gear being provided with teeth externally and internally. The bolting flange 81 has projecting dog or clutch teeth at 86 which mesh with the teeth 83 and bolts 87 hold the flange to the housing 82. The driven shaft 88 has a pinion 89 which is adapted to mesh with the dog or clutch teeth 83, with the ring gear 84 and the ring gear 85. Thus in the position shown in Figure 6 the shaft 80 and 88 are clutched together for direct drive. The shaft 88 is adapted to be swung around parallel to itself in the path described by the dotted ring 89 and is adapted to be plunged axially into mesh with any one of the four sets of teeth. Thus when the pinion 89 is in mesh with the teeth of the ring gear 84 a different speed ratio between the shaft 80 and 88 is secured of approximately two revolutions of the shaft 88 to one of the shaft 80. If the pinion 89 is meshed with the internal teeth on the ring gear 85 the ratio is again changed as illustrated in Figure 6 in approximately the ratio of three revolutions of the shaft 88 to one of the shaft 80. If the pinion 89 is meshed with the outer teeth of the ring gear 85 the drive is in the reverse direction and is in approximately the ratio of one revolution of the shaft 80 to four of the shaft 88.

It will be obvious that the ratios may be varied as desired and that in fact the application of power and the application of load may also be varied without departing from the invention. In connection with the modification shown in Figures 4 and 5 and the modification of Figures 6 and 7 the speed and synchronism indicator 45 is intended to be used where such gearing is employed in air craft or the like, but it may be omitted where a friction clutch or the like is interposed to permit the meshing of the gears before the load is applied or the drive is applied to the shaft.

I do not intend to be limited to the details shown and described.

I claim:

1. In combination, an engine housing having a bearing, a crank shaft in the bearing, a ring gear having two sets of internal teeth secured to the crank shaft, a propeller shaft, a housing for the propeller shaft, said housing having bearings for supporting the propeller shaft, a rotary bearing between said housing and the engine housing, a second shaft keyed to but axially slidable in the propeller shaft, a pinion on said second shaft and means for plunging the second shaft and pinion axially and means for swinging the housing on said rotary bearing to bring the teeth of the ring gear and of the pinion axially into line.

2. A shaft having means for securing a propeller to the outer end thereof, a housing having a bearing adjacent the propeller and a bearing at the remote end of the shaft, a second shaft telescoping in the propeller shaft between the bearings, said second shaft being keyed to the propeller shaft, means projecting through the propeller shaft and engaging the second shaft therein for shifting the same axially, and a gear mounted on the end of the second shaft.

3. A shaft having means for securing a propeller to the outer end thereof, a housing having a bearing adjacent the propeller and a bearing at the remote end of the shaft, a second shaft telescoping in the propeller shaft between the bearings, said second shaft being keyed to the propeller shaft, means projecting through the propeller shaft and engaging the second shaft for shifting the same axially, and a gear mounted on the end of the second shaft, a cooperating engine shaft, a gear connected to the engine shaft, and means for shifting the housing to bring said gears into line.

4. In combination, a hollow shaft, a second shaft telescoping in said hollow shaft, cooperating splines on the second shaft and on the inside of the hollow shaft, pins lying in the second shaft and projecting through slots in the hollow shaft, spring means for pushing the pins outwardly and a shifting collar engaged by said pins, said shifting collar embracing said hollow shaft.

5. In combination, a driving shaft, a driven shaft, an element telescoping the said driven shaft rotatably attached to the driven shaft and movable axially in the said shaft, variable speed gearing for connecting the element to the driving shaft to drive the driven shaft at variable speeds comprising a member having a plurality of internal gears and a toothed member co-operable therewith, one of said members being connected to the driving shaft and the other to the driven element, and means extending through a portion of the driven shaft and connected to the telescoping element therein for moving the element axially to engage and disengage one of the internal gears with the toothed member, and means for shifting both the driven shaft and telescoping element laterally to enable the engagement of the toothed member with another internal gear of the member.

6. In combination, a driving member, a hollow driven member, a connecting member telescoping in said hollow driven member, a shifting collar embracing said hollow driven member, pin means engaged by said collar and projecting through a slot in the hollow driven member and engaging said telescoping connecting member for shifting said member along the driven member and spring means for pushing said pin means outwardly to hold same in engagement with said collar.

In witness whereof, I hereunto subscribe my name this 16th day of May, 1923.

THOMAS L. FAWICK.